United States Patent [19]

Okado

[11] 4,263,541
[45] Apr. 21, 1981

[54] FIELD CONTROL SYSTEM FOR CONTROLLING INDUCTION MACHINES

[75] Inventor: Chihiro Okado, Fuchu, Japan

[73] Assignee: Tokyo Shibaura Denki Kabushiki Kaisha, Kawasaki, Japan

[21] Appl. No.: 35,316

[22] Filed: May 2, 1979

[30] Foreign Application Priority Data

May 10, 1978 [JP] Japan .................................. 53-55376

[51] Int. Cl.³ ............................................. H02P 5/40
[52] U.S. Cl. .................................................. 318/802
[58] Field of Search ................................. 318/798–803

[56] References Cited

U.S. PATENT DOCUMENTS

| 3,593,083 | 7/1971 | Blaschke | 318/803 |
| 3,805,135 | 4/1974 | Blaschke | 318/803 |
| 3,824,437 | 7/1974 | Blaschke | 318/803 |
| 4,088,934 | 5/1978 | D'Atre et al. | 318/802 |

OTHER PUBLICATIONS

*Field-Oriented Closed-Loop Control of an Induction Machine with the New Transvektor Control System,* Flöler & Ripperger, Siemans Review No. 6, pp. 248–251 (1972).

*Primary Examiner*—Gene Z. Rubinson
*Attorney, Agent, or Firm*—Stevens, Davis, Miller & Mosher

[57] ABSTRACT

In a system for controlling field of an induction machine such that the torque of the induction machine is reduced in proportion to a running speed thereof a frequency-voltage converter converts the frequency of a pulse signal ($f_N$ or f) given from or to the induction machine into a voltage. A function generator varies the voltage into an output ($V_{FG}$) of a predetermined variation characteristic. A multiplier multiplies the output with a reference value ($I_2$) indicative of a desired torque. And a voltage-frequency converter converts the product into a frequency ($f_S$) used for the control of the induction machine.

5 Claims, 8 Drawing Figures

FIELD CONTROL SYSTEM FOR CONTROLLING INDUCTION MACHINES

BACKGROUND OF THE INVENTION

This invention relates to a field control system of induction machines which is stable in operation and economical in manufacture.

Heretofore an arrangement as shown in FIG. 1 has been frequently used for the field control of induction machines, the arrangement comprising a main power circuit and a control circuit. The main power circuit includes a DC power source 1, electric valves 2A and 2B for chopping electric current supplied from the DC power source 1, bypass rectifiers 3A and 3B cross-connected between the electric valves 2A and 2B, a reactor 4 one end of which is connected to the electric valve 2A, a thyristor 5 connected in parallel with the reactor 4, a thyristor bridge 6 connected through the reactor 4 and the thyristor 5 to the electric valves 2A and 2B, and a current detector 7 connected between the electric valve 2B and the thyristor bridge 6. An induction machine 8 is connected to the AC side of the thyristor bridge 6. The running speed of the induction machine 8 is controlled with respect to its slip frequency as described hereinbelow.

In the control circuit, a pulse generator 9 is directly coupled to the induction machine for generating pulses in proportion to the running speed of the induction machine 8. The frequency of the output of the pulse generator 9 is converted by a frequency-voltage converter 10 into a voltage $V_N$ proportional to the running speed of the induction machine 8. An amplifier 11 is connected to amplify the difference between the voltage $V_N$ and a reference signal $S_R$ indicative of the running speed of the induction machine 8, and the output of the amplifier 11 is applied to a function generator 12 as a torque standard. The function generator 12 thus generates a standard signal $I_R$ related to the primary current of the induction machine 8 inclusive of the exciting current, and this signal $I_R$ is compared with a signal I indicative of an inverter current obtained from the current detector 7. A phase shifter 13 is connected to shift the phase angle of the difference signal. A pulse amplifier 14 is connected to amplify the output signal PWM from the phase shifter 13. The output signal SWG obtained from the pulse amplifier 14 is applied to the control gate electrodes of the electric valves 2A and 2B.

The output $I_2$ constituting a torque standard is also amplified by an amplifier 15. A voltage-frequency converter 16 is connected to convert the output of the amplifier 15 into a slip-frequency indicative signal $f_S$ which is added (in the case of motor-operation of the induction machine) to or subtracted (in the case of regenerating operation of the same machine) from the pulse frequency $f_N$ of the pulse generator 9, the sum or difference being amplified in a pulse amplifier 17. The output of the pulse amplifier 17 constituting $SCR_G$ timing signal for the inverter operation is applied to the control gate electrodes of the thyristor bridge 6 and the thyristor 5.

For the purpose of effecting a reduced flux control (which may otherwise be termed a weakened field control) of the induction machine, a transformer 18 is provided to detect terminal voltage of the induction machine, the output of the transformer 18 being converted into a DC voltage $V_M$ by a rectifier 19. The voltage $V_M$ is compared with a reference voltage $V_R$, and the difference is amplified by an adder-amplifier 20. The output of the amplifier 20 is further added to the aforementioned signal $I_2$ of the torque standard (or secondary current standard) and the sum is amplified by the amplifier 15. With the aforementioned circuitry, when the terminal voltage $V_M$ of the induction machine 8 exceeds the voltage standard $V_R$, the output of the amplifier 20 increases, thereby increasing the slip frequency $f_S$ for effecting the reduced flux control.

In the conventional field control system utilizing the above described control circuit, since a large amount of high frequency components are contained in the terminal voltage of the induction machine, the DC voltage $V_M$ obtained by rectifying the terminal voltage widely differs from the induced electromotive force of the induction machine, thus giving rise to a disadvantage which causes the reduced flux control of the induction machine to be substantially impossible.

SUMMARY OF THE INVENTION

An object of the present invention is to provide a field control system of an induction machine wherein the above-mentioned disadvantage can be substantially eliminated, and the reduced flux control can be effectuated in a stable manner and economically.

According to the present invention, there is provided a field control system for controlling an induction machine driven from a DC power source through a semiconductor inverter so that the output torque of the induction machine is reduced in proportion to a running speed thereof, said system comprising means for converting a pulse frequency signal ($f_N$) of said machine into a voltage ($V_N$) indicative of a running speed, means for comparing said voltage ($V_N$) with a reference voltage ($S_R$) and delivering an output ($I_2$) indicative of the difference, a function generator connected to receive said voltage ($V_N$) for delivering an output ($V_{FG}$) of a desired form, a multiplier for multiplying said output ($I_2$) with the output ($V_{FG}$), means for converting the output of the multiplier into a slip frequency indicative signal ($f_S$), and means for adding, in the case of the motor operation of said induction machine, said pulse frequency signal ($f_N$) to said slip frequency ($f_S$), or subtracting, in the case of regenerative operation, said slip frequency ($f_S$) from said pulse frequency ($f_N$), and delivering the output pulses of the resultant frequency (f) to control said semiconductor inverter.

Various embodiments of the invention are also described in the following detailed description of the invention with reference to the accompanying drawings.

DESCRIPTION OF PREFERRED EMBODIMENTS

Figure 1:
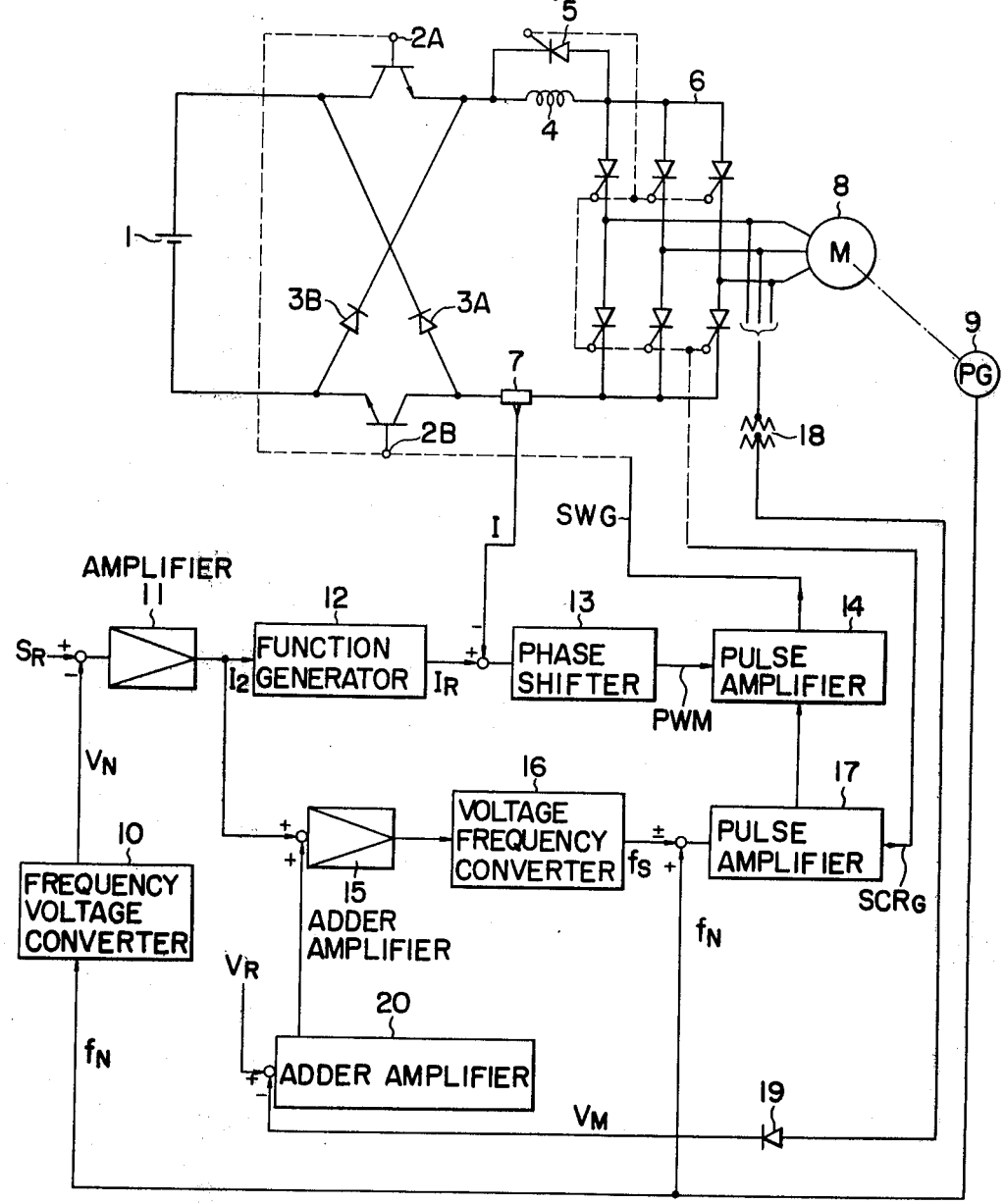
FIG. 1 is a block diagram of a conventional field control system.

The embodiments of the present invention will now be described with reference to FIGS. 2 to 8 wherein like members and parts are designated by like reference numerals.

Figure 2:
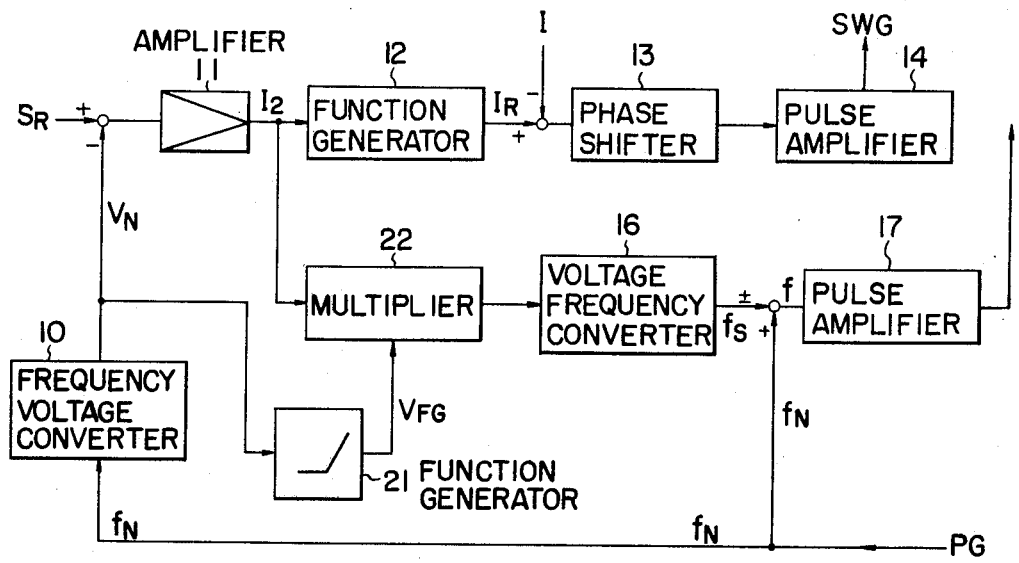
FIG. 2 is a block diagram showing essential elements of a field control system according to the present invention.

In an embodiment shown in FIG. 2, the pulse frequency $f_N$ proportional to the running speed of the induction machine, obtained from the pulse generator 9, are converted by the frequency-voltage converter 10 into a voltage $V_N$ also proportional to the running speed. The voltage $V_N$ is compared with the speed reference signal $S_R$ and amplified by the amplifier 11, and the output $I_2$ thereof constituting a torque standard is applied to the function generator 12, as described hereinbefore with reference to FIG. 1. From the function generator 12, the primary current standard signal $I_R$ including the exciting current of the induction machine is obtained. This signal $I_R$ is compared as described hereinbefore with the signal I indicative of the inverter current obtained from the current detector 7, and the difference is passed through the phase shifter 13 and the pulse amplifier 14, the signal SWG thus obtained being applied to the gate electrodes of the electric valves 2A and 2B for controlling the DC current as also described hereinbefore.

The output voltage $V_N$ from the frequency-voltage converter 10 is, according to the present invention, further applied to a function generator 21 as shown in FIG. 2. The output $V_{FG}$ of the function generator 21 is applied to a multiplier 22 to be multiplied with the torque standard $I_2$, and is converted by the voltage-frequency converter 16 into a frequency $f_S$. This frequency $f_S$ is thereafter added to (in the case of motor operation) or subtracted (in the case of regenerating operation) from the pulse frequency $f_N$ obtained from the pulse generator 9. The resultant frequency f is amplified in the pulse amplifier 17, and the output $SCR_G$ thereof is applied to the gate electrodes of the thyristors of the thyristor bridge 6 and to the gate electrode of the thyristor 5 for controlling the operation of the induction machine.

According to the field control system of this invention, the operation of the induction machine is controlled as follows.

It is assumed that the secondary resistance of the induction machine 8 is $r_2$, the slip frequency thereof is $f_S$, and the back electromotive force and the secondary current of the induction machine are $V_2$ and $I_2$, respectively. It is further assumed that the frequency of the inverter output supplied to the induction machine is f, the rotating speed of and the torque generated from the induction machine are N and T, respectively, and that the number of poles thereof is p. Then, the following relations exist between these variables.

$$I_2 = \frac{V_2}{f} \cdot \frac{f_S}{r_2} \qquad (1)$$

$$T = \frac{3p}{4\pi} \cdot I_2^2 \cdot \frac{r_2}{f_S} \qquad (2)$$

For the purpose of effecting a reduced flux control of the induction machine while maintaining the back electromotive force $V_2$ at a constant value, the equation (1) is changed as follows.

$$f_S = I_2 \cdot \frac{f}{V_2} \cdot r_2 = k_1 \cdot r_2 \cdot I_2 \cdot f \qquad (3)$$

wherein
$V_2$ = constant
$r_2$ = constant
$k_1$ is a constant. Controlling the $f_S$ in proportion to the product of $I_2$ and f, following equation (4) is obtained from equations (2) and (3).

$$T = \frac{3p}{4\pi} \cdot \frac{I_2}{k_1 f} \qquad (4)$$

Since $f_S << f$ in the high speed region wherein the reduced flux control is effected, a relation $$f \approx k_2 N \qquad (5)$$

is satisfied, wherein $k_2$ is a constant. For this reason, equations (3) and (4) can be modified as follows.

$$f_S \approx k_3 \cdot I_2 \cdot N \qquad (6)$$

$$T \approx k_4 \cdot \frac{I_2}{N} \qquad (7)$$

wherein $k_3$ and $k_4$ are constants.

As is apparent from these relations, a reduced flux control can be obtained by varying the slip frequency $f_S$ in proportion to the product of the secondary current $I_2$ and the rotating speed N of the induction machine, while the secondary current $I_2$ is maintained at a constant value.

Figure 3:
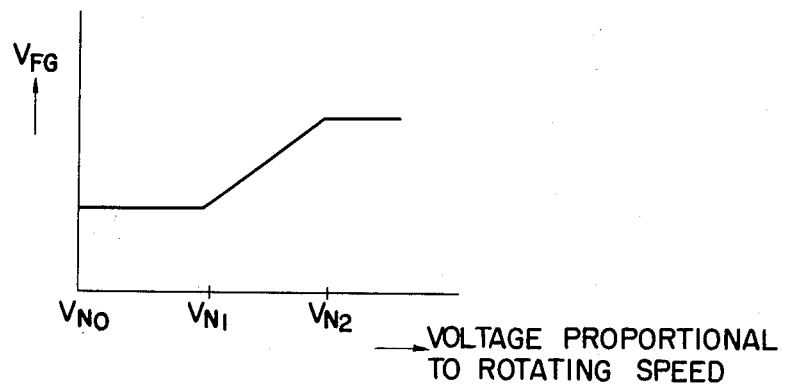
FIGS. 3 and 4 are diagrams showing operations of the field control arrangement according to this invention.
Figure 4:
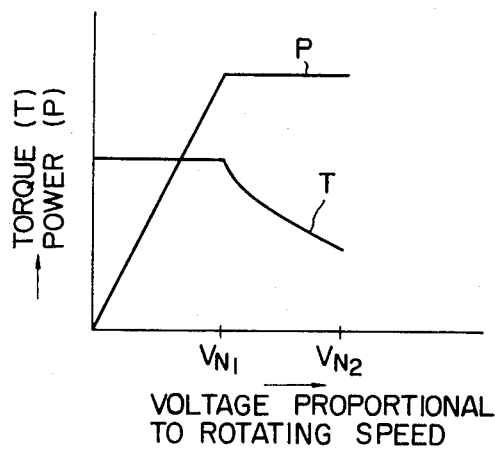

The function generator 21 in FIG. 2 has an output characteristic as shown in FIG. 3. Although a substantially constant output $V_{FG}$ is produced in a range of the input from $V_{N0}$ to $V_{N1}$, the output $V_{FG}$ is varied in proportion to $V_N$, and hence to N, in a range of from $V_{N1}$ to $V_{N2}$. Thus the multiplier 22 calculates the equation (6), and therefore a stable reducing flux control can be achieved. The relation between the power P, torque T, and the speed, in this case, is exhibited exemplarily in FIG. 4. As is apparent from equations (3) and (4), an accurate control with a constant power can be realized by controlling the slip frequency $f_S$ in proportion to the product of a voltage proportional to the inverter frequency f supplied to the induction machine and the secondary current $I_2$ of the same machine.

Although in the above description, the reduced flux control of the machine has been carried out in such a manner that slip frequency $f_S$ thereof would be proportional to the product of the secondary current standard $I_2$ and running speed N of the machine, the invention can also be modified as follows.

Figure 5:
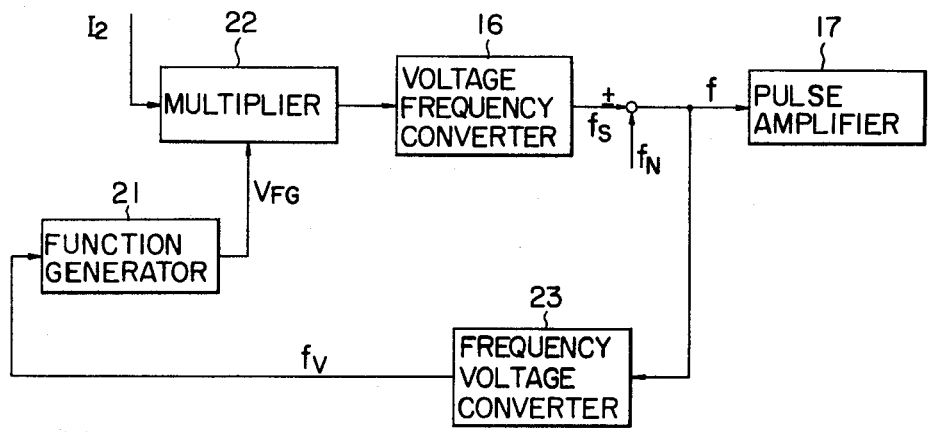
FIGS. 5 through 8 are block diagrams showing the parts modified according to the present invention.

In an embodiment of the invention shown in FIG. 5, a frequency-voltage converter 23 is connected to receive the inverter frequency f and to convert the same into a voltage $f_V$ proportional to the inverter frequency f. The voltage $f_V$ is applied to the function generator 21 of FIG. 2. The output $V_{FG}$ of the function generator 21 is connected to be multiplied by the secondary current standard $I_2$ in a multiplier 22, and the output thereof is applied to the voltage-frequency converter 16 so that the inverter is controlled by the output of the converter 16 which is proportional to the product of the two values. As is apparent from the equations (3) and (4), in this case also can be achieved the reduced flux control while the back electromotive force $V_2$ is being held substantially constant.

Figure 6:
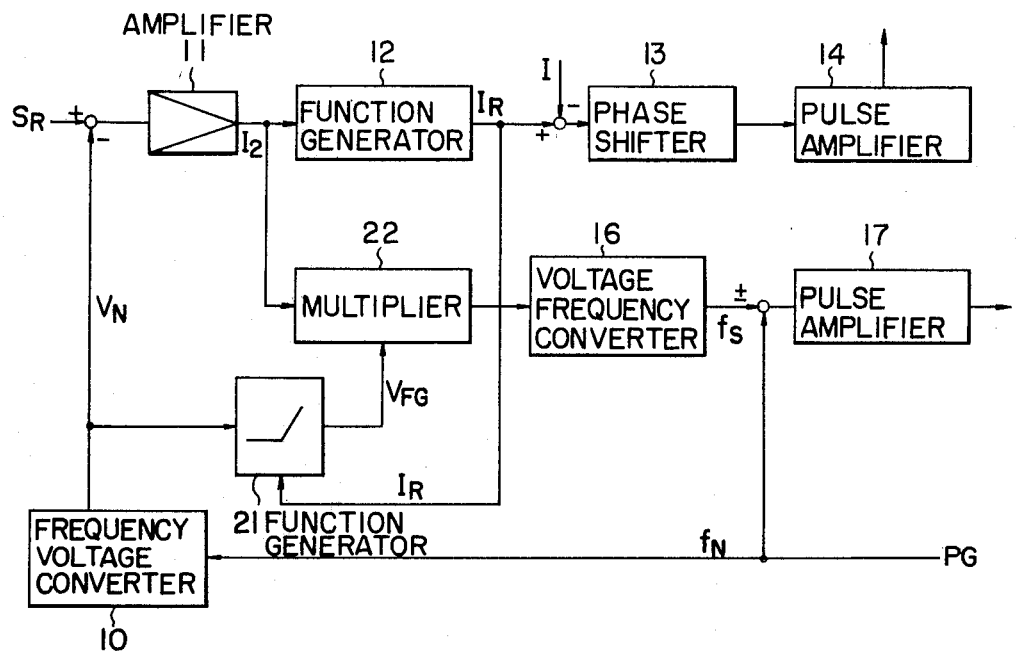

In FIG. 6, there is indicated still another embodiment of the present invention wherein the function generator 21 is connected in a manner such that the output thereof is corrected by the primary current standard $I_R$, and a reduced flux control of the induction machine is thereby realized while maintaining the terminal voltage substantially constant. It is apparent from equation (3) that when it is required to control the terminal voltage of the induction machine to be substantially constant, the back electromotive force $V_2$ must be reduced when the primary current standard $I_R$ increases. For the realization of such a condition, $f/V_2$ in equation (3) is modified by the primary current standard $I_R$. That is, the current standard $I_R$ is applied to the control input of the function generator 21, and the output of the function generator thus corrected is applied to an input of the multiplier 22.

Figure 7:
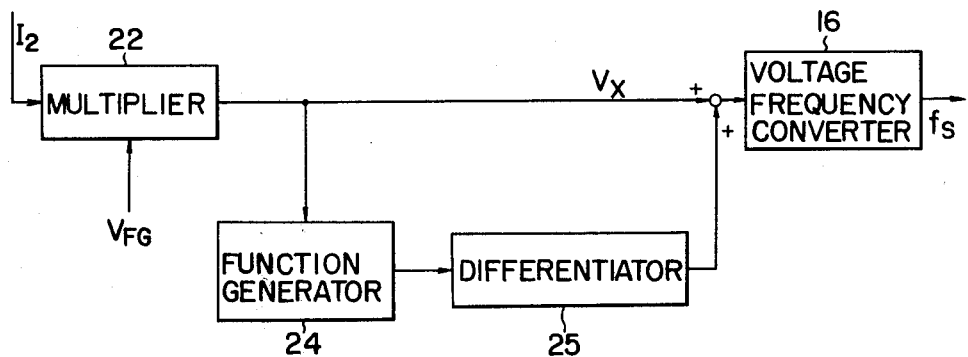

In an embodiment shown in FIG. 7, a portion of the output $V_X$ of the multiplier 22 multiplying the output $V_{FG}$ of the function generator 21 with the current standard $I_2$ is supplied to another function generator 24 and a differentiator 25, and the output of the differentiator 25 is added to the output $V_X$. The sum is applied to the input of the voltage-frequency converter 16. With the above described construction, the response speed of the control is much improved by the function generator 24 and the differentiator 25.

Figure 8:
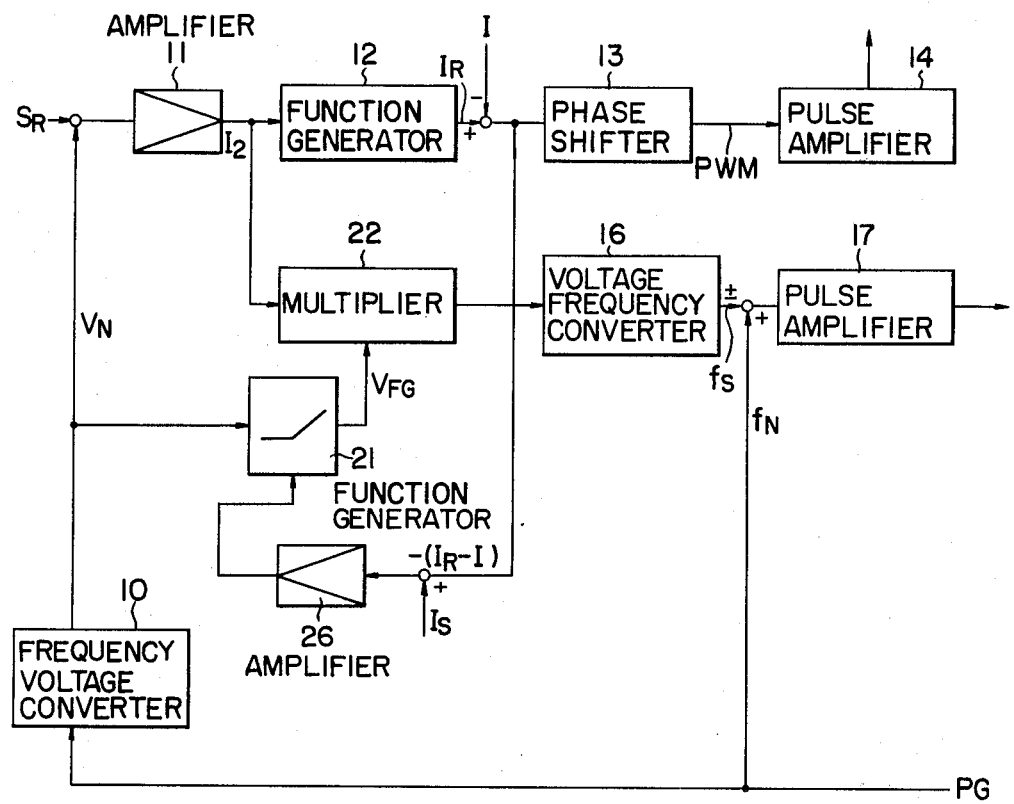

FIG. 8 illustrates still another embodiment of the present invention. In this embodiment, the circuit is so arranged that the input voltage $(I_R - I)$ of the phase shifter 13 is further compared with a reference voltage $I_S$, and when the input voltage $(I_R - I)$ exceeds a predetermine voltage, the difference is amplified by an amplifier 26 and then used to correct the output $V_{FG}$ of the function generator 21. In this manner, the disadvantage of the previous embodiments, wherein insufficient current is caused regardless of the thyristors being fully ignited by the PWM control pulse, can be prevented. Furthermore, an operating condition in which the phase shifter 13 tends to saturate can be detected, and the slip frequency can be increased for increasing the secondary current of the induction machine.

Although, in the above description, the invention has been described for the cases where the induction machine is controlled with respect to its input frequency, it is apparent that the invention is also applicable to the cases where the induction machine is controlled with respect to the input voltage. Furthermore, the invention is not necessarily be limited to those arrangements where the thyristors are commutated as one group, but it can be applied to those cases where the thyristors are commutated in a different manner.

What is claimed is:

1. A field control system for controlling an induction machine driven from a power source through a semiconductor inverter so that the output torque of the induction machine is reduced in proportion to a running speed thereof, said system comprising means for converting a pulse frequency ($f_N$) of said machine into a voltage ($V_N$) indicative of a running speed, means for comparing said voltage ($V_N$) with a reference voltage ($S_R$) and delivering an output ($I_2$) corresponding to the difference, a function generator connected to receive said voltage ($V_N$) for delivering an output ($V_{FG}$) partially proportional to said voltage ($V_N$), a multiplier for multiplying said output ($I_2$) with the output ($V_{FG}$), means for converting the output of the multiplier into a slip frequency ($f_S$), and means for adding, in the case of the motor operation of said induction machine, said slip frequency ($f_S$) to said pulse frequency ($f_N$), or subtracting, in the case of regenerative operation, said slip frequency ($f_S$) from said pulse frequency ($f_N$), thereby delivering the output pulses of the resultant frequency (f) to control said semiconductor inverter.

2. A field control system for controlling an induction machine driven from a power source through a semiconductor inverter so that the torque of the induction machine is reduced in proportion to the running speed thereof, said system comprising means for converting a pulse frequency ($f_N$) of said machine into a voltage ($V_N$) indicative of a running speed, means for comparing said voltage ($V_N$) with a reference voltage ($S_R$) and delivering an output ($I_2$) corresponding to the difference, means for converting a resultant frequency (f) which is used to control the inverter into a voltage ($f_V$), a function generator for receiving said voltage ($f_V$) and delivering an output ($V_{FG}$) of a desired form, a multiplier for multiplying said output ($I_2$) with the output ($V_{FG}$), means for converting the output of the multiplier into a frequency indicative of a slip frequency ($f_S$), and means for adding, in the case of the motor operation of said induction machine, said slip frequency ($f_S$) to said pulse frequency ($f_N$), or subtracting, in the case of regenerative operation, said slip frequency ($f_S$) from said pulse frequency ($f_N$), and for delivering an output of a frequency (f) to control said semiconductor inverter.

3. A field control system as set forth in claim 1 further comprising an additional function generator connected to receive said output ($I_2$) and to deliver an output ($I_R$) of a desired form to said first mentioned function generator, so that the first mentioned function generator delivers an output ($V_{FG}$) to said multiplier.

4. A field control system as set forth in claim 1 further comprising a still another function generator connected to receive the output ($V_X$) of said multiplier, and a differentiator to receive the output of said still another function generator for delivering the output, thereof, in addition to the output ($V_X$) of the multiplier, to said voltage-frequency converter which delivers an output ($f_S$) to said adding/subtracting means.

5. A field control system as set forth in claim 3 further comprising a first comparator for comparing the output ($I_R$) of said additional function generator with a value (I) indicative of a power source current, a second comparator comparing the difference ($I_R - I$) with a reference value ($I_S$), and an amplifier which amplifies the output of said second comparator when the difference ($I_R - I$) exceeds the reference value ($I_S$), and applies the output to said first mentioned function generator.

* * * * *